US012660955B2

(12) United States Patent
Morris et al.

(10) Patent No.: US 12,660,955 B2
(45) Date of Patent: *Jun. 23, 2026

(54) DEVICES AND METHODS FOR ORGANIZING HATS

(71) Applicant: WILRIS LLC, Arvada, CO (US)

(72) Inventors: Chase William Morris, Arvada, CO (US); Ryne Wilson, Northglenn, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/902,012

(22) Filed: Sep. 30, 2024

(65) Prior Publication Data

US 2025/0017404 A1     Jan. 16, 2025

Related U.S. Application Data

(63) Continuation of application No. 17/909,320, filed as application No. PCT/US2021/020543 on Mar. 2, 2021, now Pat. No. 12,121,170.

(60) Provisional application No. 62/984,052, filed on Mar. 2, 2020.

(51) Int. Cl.
*A47G 25/10* (2006.01)
*F16B 1/00* (2006.01)

(52) U.S. Cl.
CPC ................ *A47G 25/10* (2013.01); *F16B 1/00* (2013.01); *A47G 2200/106* (2013.01); *F16B 2200/83* (2023.08)

(58) Field of Classification Search
CPC ..... A47G 25/10; A47G 2200/106; F16B 1/00; F16B 2200/83; A47F 7/06
See application file for complete search history.

(56) References Cited

U.S. PATENT DOCUMENTS

| | | |
|---|---|---|
| 323,773 A | 8/1885 | Badge |
| 350,807 A | 10/1886 | Clark |
| 394,792 A | 12/1888 | Shoe |
| 411,387 A | 9/1889 | Manning |
| 421,879 A | 2/1890 | Wilson |
| 451,568 A | 5/1891 | Murrin |
| 503,949 A | 8/1893 | Crouch |
| 532,109 A | 1/1895 | Stinchcomb et al. |
| 621,023 A | 3/1899 | Boas |
| 1,403,004 A | 1/1922 | Beckers |

(Continued)

FOREIGN PATENT DOCUMENTS

WO          2021178451          9/2021

*Primary Examiner* — Ko H Chan
(74) *Attorney, Agent, or Firm* — Method IP, LLC; Christopher R Stanton

(57) ABSTRACT

A hat holder for effectively holding a hat in a manner and position simulating the position that the hat would take when placed on a person's head, effectively displaying the front portion of the hat and maintaining the shape of the hat without leaving any marks on the hat. The device includes a magnet that creates a magnetic bond with the ferrous part of the hat, a general hat form being additional support for maintaining the general shape of a hat, an arm that connects from the support structure to the base and a base which allows the hat to be supported from various support structures including but not limited to a vertical wall surface or the like with the orientation enabling the hat to be positioned generally in the attitude that the hat would assume when placed on a person's head.

19 Claims, 7 Drawing Sheets

(56) References Cited

U.S. PATENT DOCUMENTS

| | | | |
|---|---|---|---|
| 1,450,535 A | | 4/1923 | Yoder |
| 1,451,568 A | | 4/1923 | Farnham |
| 1,572,973 A | * | 2/1926 | Tait ........................ A47G 25/10 |
| | | | 211/32 |
| 2,500,837 A | * | 3/1950 | Le Vine ............... B43K 23/001 |
| | | | 248/231.71 |
| D161,680 S | | 1/1951 | Cook |
| 3,208,597 A | | 9/1965 | Hansen |
| D269,486 S | | 6/1983 | Marrs |
| 5,188,325 A | | 2/1993 | Hilty et al. |
| 5,630,516 A | | 5/1997 | Helman |
| 5,772,049 A | | 6/1998 | Randone |
| 6,079,679 A | | 6/2000 | Mitchell |
| 6,196,428 B1 | * | 3/2001 | Robak .................... A47G 25/10 |
| | | | 223/24 |
| D465,724 S | | 11/2002 | Goodman et al. |
| 6,672,551 B2 | | 1/2004 | Rivellino et al. |
| D647,710 S | | 11/2011 | Anderson |
| D666,478 S | | 9/2012 | Chou |
| D715,627 S | | 10/2014 | Pan et al. |
| 9,182,074 B2 | | 11/2015 | Duenas |
| D858,116 S | | 9/2019 | Wierbicki |
| 2013/0292523 A1 | | 11/2013 | Moore et al. |
| 2013/0313387 A1 | | 11/2013 | Ly |
| 2015/0298617 A1 | | 10/2015 | Welch |
| 2015/0346509 A1 | * | 12/2015 | Walker .................... G02C 3/02 |
| | | | 351/178 |

* cited by examiner

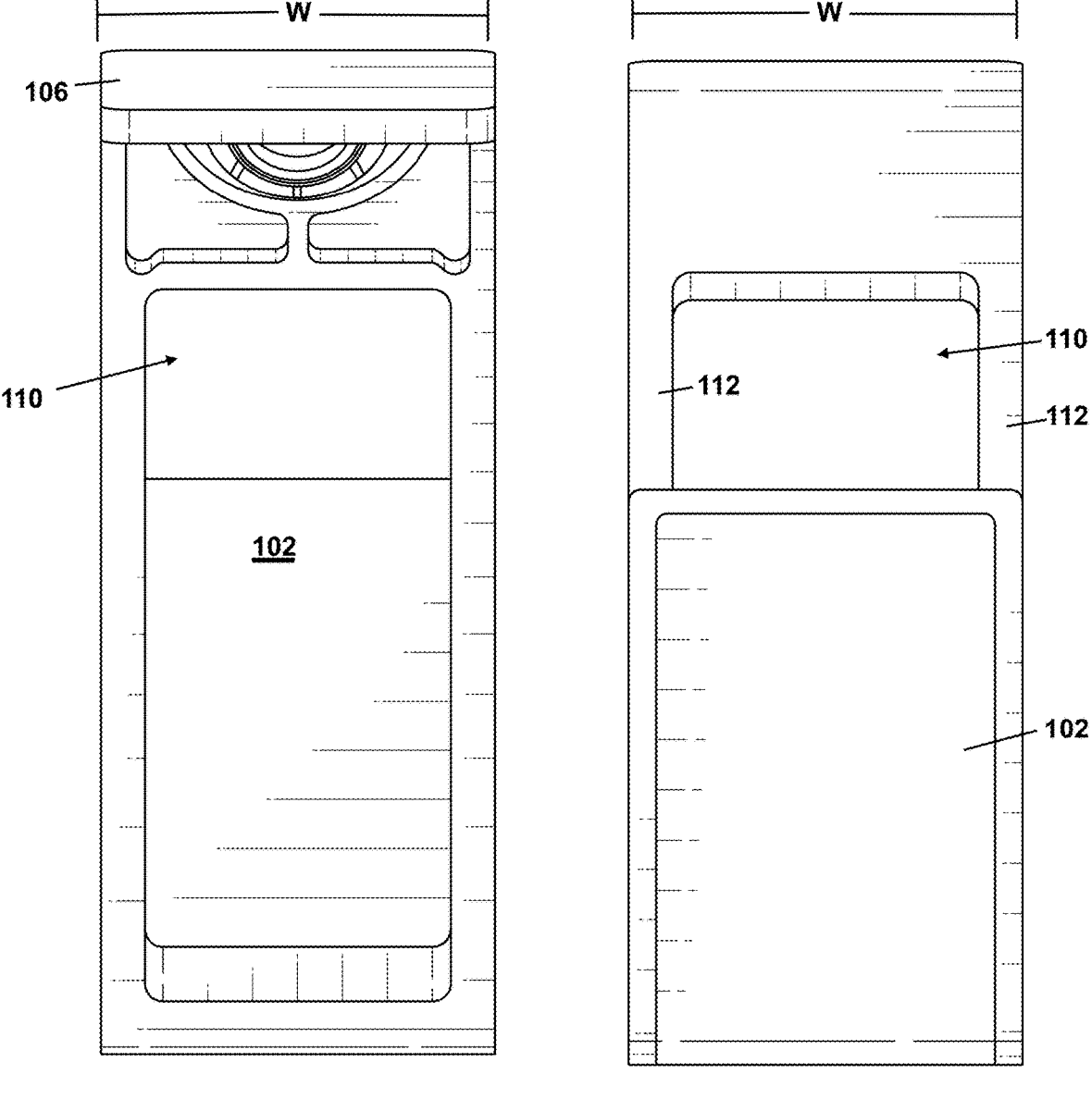
FIG. 2                    FIG. 3

DEVICES AND METHODS FOR ORGANIZING HATS

CROSS-REFERENCE TO RELATED APPLICATIONS

This application is a continuation of U.S. patent application Ser. No. 17/909,320, filed Sep. 2, 2022, which claims the benefit of and priority to PCT/US21/20543, filed Mar. 2, 2021, which claims the benefit of and priority to U.S. Provisional Application No. 62/984,052, filed Mar. 2, 2020, each of which is hereby incorporated by reference in their entireties.

BACKGROUND

The majority of existing hat holders rely on some combination of gravity, friction and clamping forces to hold a hat in place. These hat holders position the hat such that the front of the hat, typically showing a logo, is not visible. For example, U.S. Pat. No. 9,182,074 discloses a hat holder configured to hang a hat in a downward orientation. While such a system may adequately hold a hat, it does not satisfy a hat retailer or hat owner who wishes to display the logos, messages and/or designs on the faces of their hats.

SUMMARY

The devices and methods disclosed herein solve the problem of obscuring a stored hat's message or design by providing a hat holder configured to allow a hat, such as a baseball cap, to be held in an as-worn orientation (e.g., with an axis oriented along a crest of the brim substantially parallel with a plane of the ground). In an embodiment, a magnet within the hat holder attracts magnetic material within a button located on the top of a ballcap to keep the weight of the hat brim from pulling the hat into a downward orientation.

In an aspect, a hat holder comprises a base configured for attachment to a mounting surface, an arm connected to the base and extending away from the mounting surface, the arm joining a brim-support to form a crest, and a magnet intersected by a plane through and parallel with the crest. In an embodiment, the magnet is bisected by the plane through the crest.

In an embodiment, widths of the base, the arm and/or the brim-support are the same.

In an embodiment, the arm forms an acute angle with a body of the base.

In an embodiment, a magnet of the hat holder is disposed in an underside of the hat holder or in a topside of the hat holder. In an embodiment, a magnet is fully encased within the hat holder.

In an embodiment, the arm of the hat holder is connected to an end of the base. In an embodiment, the arm of the hat holder is connected to an end of the brim-support.

In an embodiment, the arm of the hat holder is connected to both the end of the base and the end of the brim-support.

In an embodiment, a bottom surface of the base is configured to mate with a wall cleat. In an embodiment, the bottom surface of the base slidably mates with the wall cleat.

In an embodiment, the arm of the hat holder comprises a slot. In an embodiment, the brim-support of the hat holder comprises an opening.

In an embodiment, a mounting surface that the hat holder is intended to be affixed to is a vertically oriented mounting surface.

In an aspect, a hat hold comprises a base configured for attachment to a mounting surface and an arm connected to the base and extending away from the mounting surface, wherein the arm joins a brim-support to form a crest and wherein widths of the base, the arm, and the brim-support are the same. In an embodiment, the hat holder further comprises a magnet intersected by a plane through and parallel with the crest. In an embodiment, the magnet is bisected by the plane through the crest.

In an aspect, a method of displaying a hat comprises mounting a hat holder as disclosed herein to a vertically oriented mounting surface and placing a hat over the brim-support. In an embodiment, placing the hat over the brim-support comprises placing the hat such that a magnetic material of the hat is attracted to the magnet within the hat holder.

In an embodiment, the hat holder displays a hat generally in the attitude the hat would assume when worn by a person. In an embodiment, the hat holder displays the front of the hat. In an embodiment, the hat holder is not visible when a hat is on the holder and it is viewed from the front at eye level.

In an embodiment, a wall cleat comprises an adhesive for joining the wall cleat with a mounting surface.

BRIEF DESCRIPTION OF THE DRAWINGS

Illustrative embodiments of the present invention are described in detail below with reference to the attached drawings.

FIG. 2 is a front plan view of the hat holder of FIG. 1.

FIG. 3 is a back plan view of a hat holder of FIGS. 1-2.

DETAILED DESCRIPTION

Figure 1:
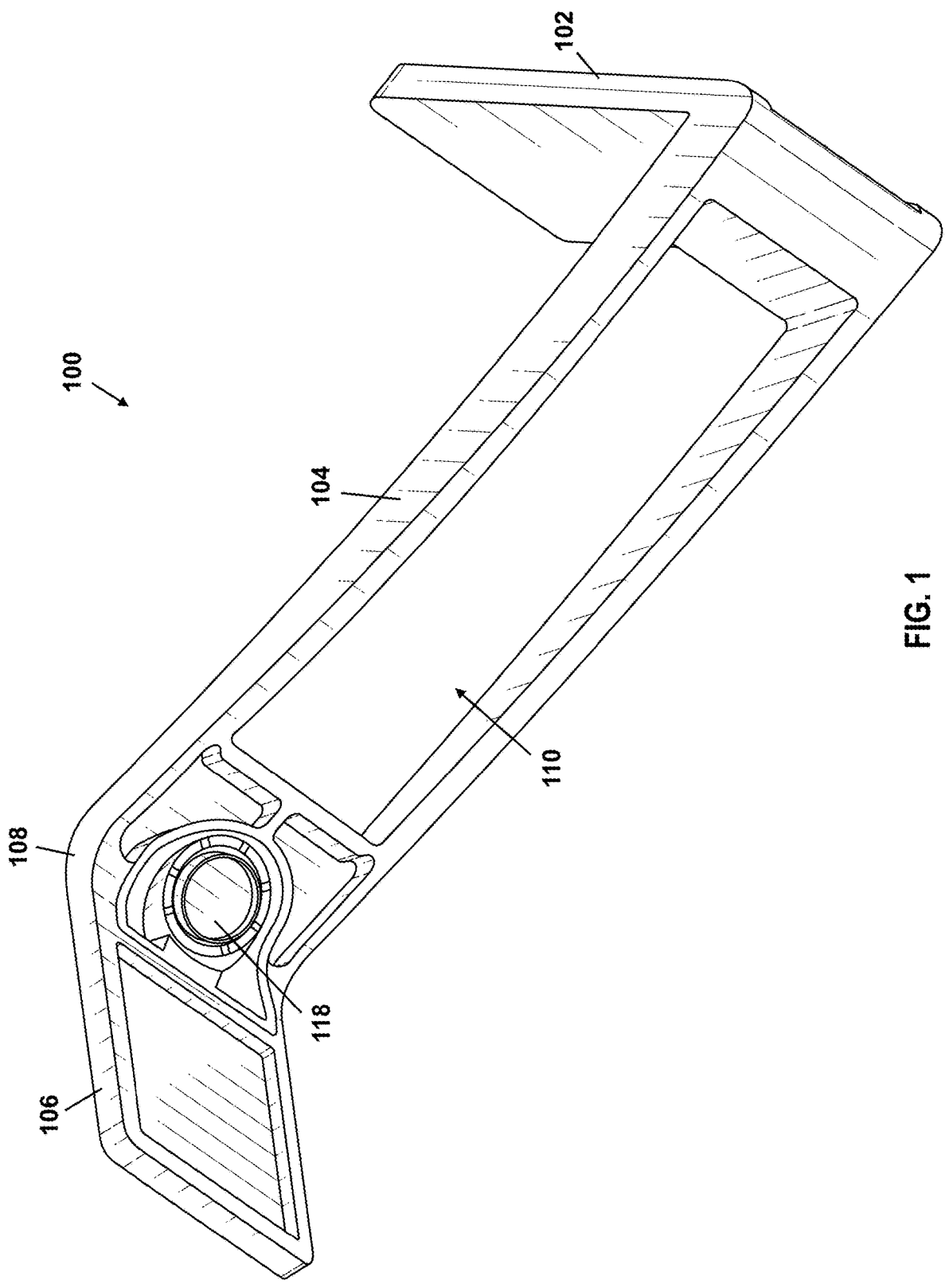
FIG. 1 is a perspective view of a hat holder, according to an embodiment.
Figure 4:
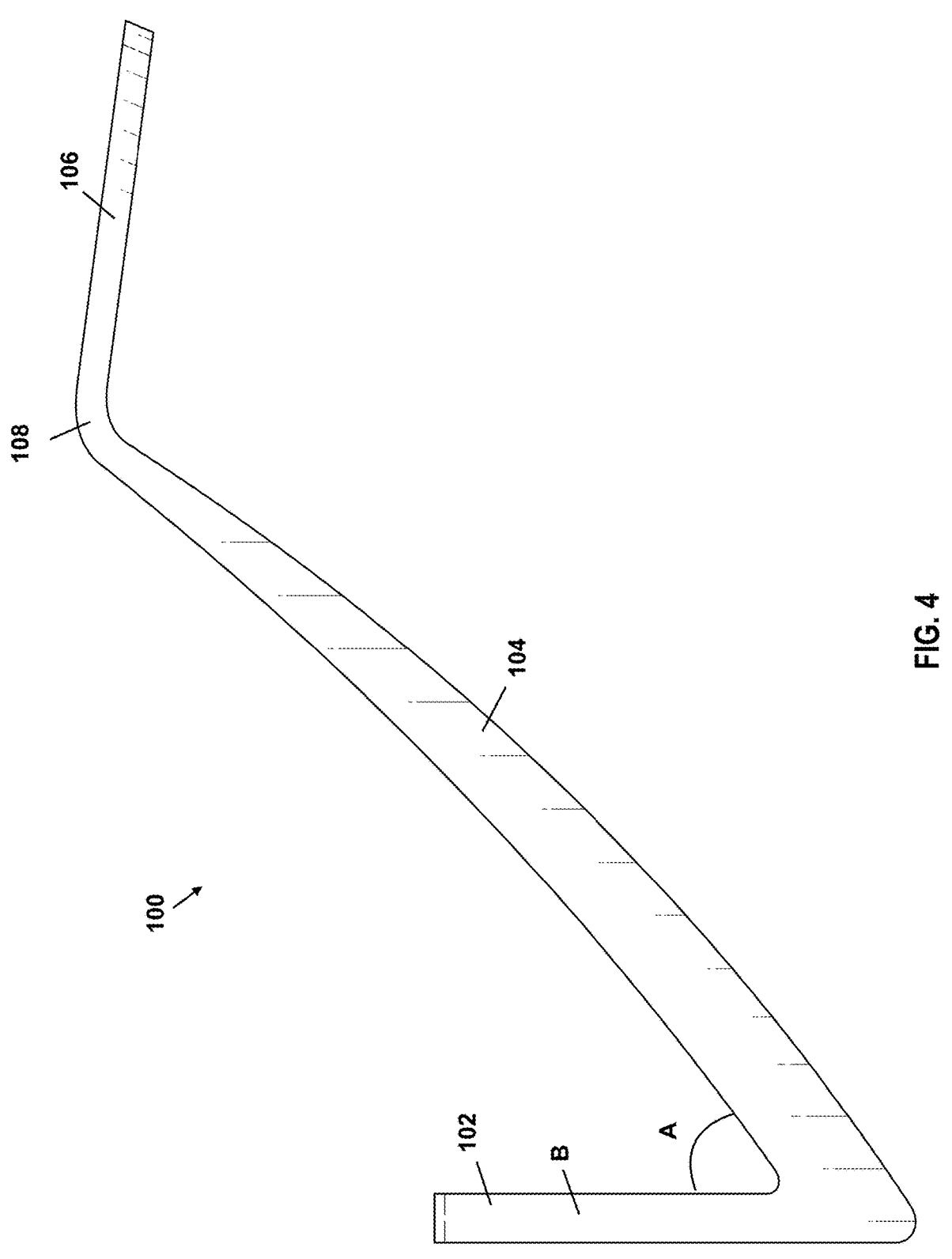
FIG. 4 is a left side plan view of a hat holder of FIGS. 1-3.
Figure 5:
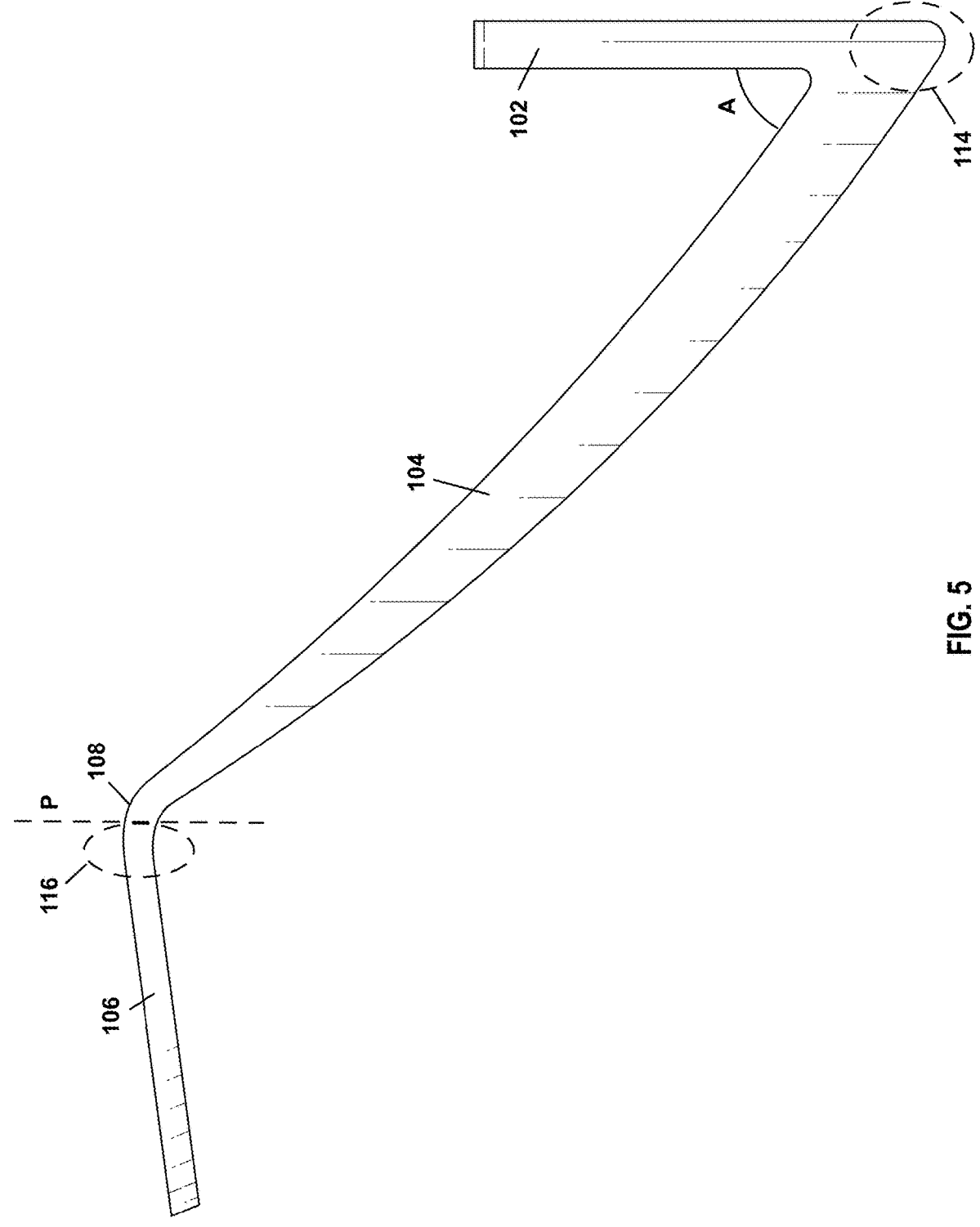
FIG. 5 is a right side plan view of a hat holder of FIGS. 1-4.
Figures 6, 7:
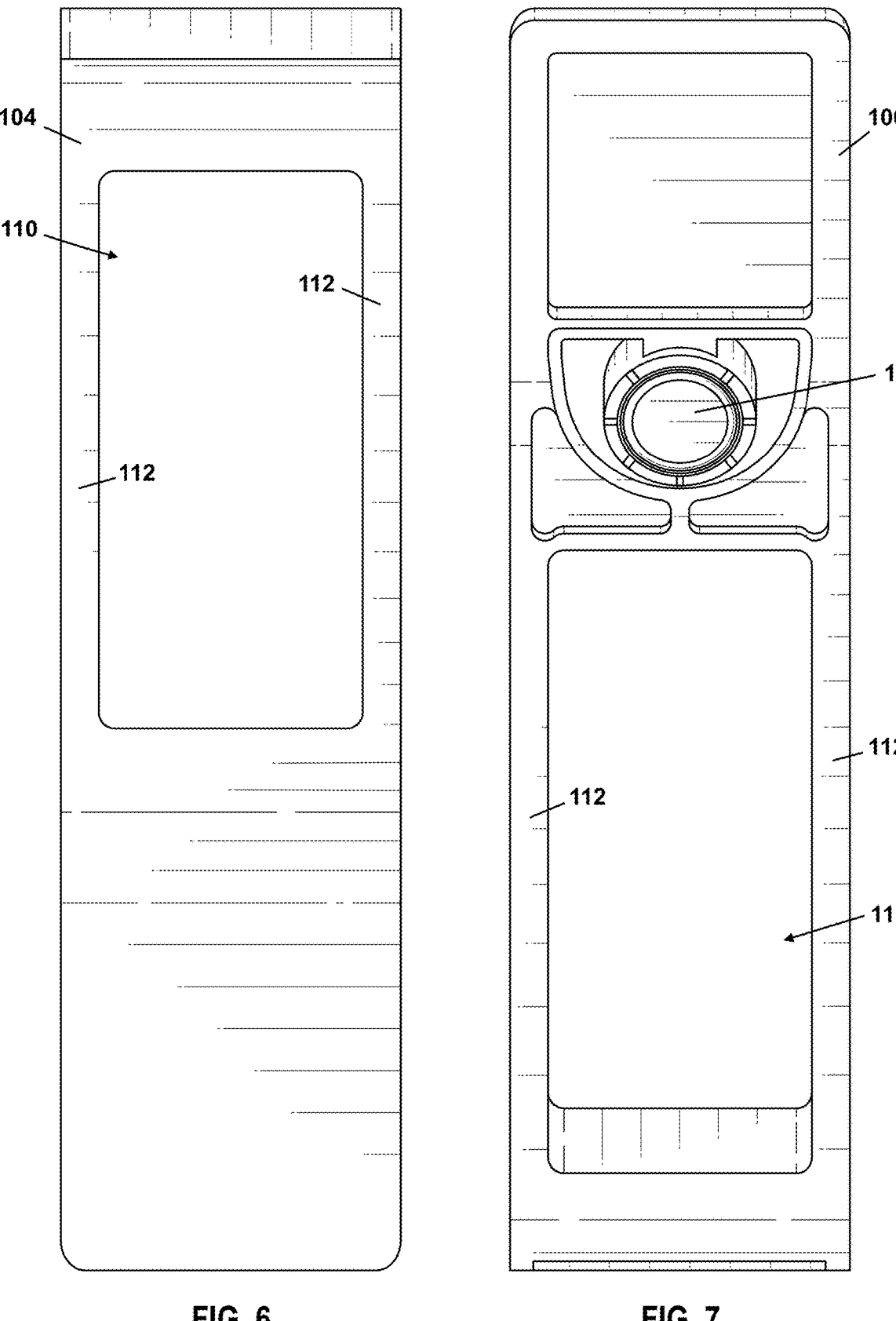
FIG. 6 is a top plan view of a hat holder of FIGS. 1-5.
FIG. 7 is a bottom plan view of a hat holder of FIGS. 1-6.

In general, the terms and phrases used herein have their art-recognized meaning, which can be found by reference to standard texts, journal references and contexts known to those skilled in the art. The following definitions are provided to clarify their specific use in the context of this description.

"Proximal" and "distal" refer to the relative positions of two or more objects, planes or surfaces. For example, an object that is close in space to a reference point relative to the position of another object is considered proximal to the reference point, whereas an object that is further away in space from a reference point relative to the position of another object is considered distal to the reference point.

The terms "direct and indirect" describe the actions or physical positions of one component relative to another component. For example, a component that "directly" acts upon or touches another component does so without intervention from an intermediary. Contrarily, a component that "indirectly" acts upon or touches another component does so through an intermediary (e.g., a third component).

FIGS. 1-7 show a first embodiment of a hat holder 100 comprising a base 102 configured for substantially flush attachment to a mounting surface (such as a vertical wall or other vertical surface) and an arm 104 connected to base 102 and extending away from the mounting surface, Arm 104 joins a brim-support 106 to form a crest 108. As shown, widths (VV) of base 102, arm 104, and brim-support 106 are the same, and arm 104 extends away from the mounting surface forming an acute angle (A) with a body (B) of base 102. Arm 104, as shown, also comprises a slot 110 such that arm 104 contains two longitudinal structural supports 112. Further, arm 104 is connected to an end 114 of base 102 and an end 116 of brim-support 106.

In an embodiment, a magnet 118 is disposed within hat holder 100. For example, magnet 118 may be intersected by a plane (P) through and parallel with crest 108. In an embodiment, magnet 118 may be bisected by the plane (P) through crest 108. As shown, magnet 118 is disposed in an underside of hat holder 100. Magnet 118 is positioned to attract a magnetic button of a ball cap when the hat is positioned over the hat holder. The attraction between magnet 118 and the magnetic button holds the hat is an "as-worn" orientation and does not allow the weight of the brim to pull the hat downward.

In an embodiment, base 102 may be screwed into a mounting surface. In an embodiment, a bottom surface 116 of base 102 is configured to mate with a wall cleat (not shown), for example, by slidably mating with the wall cleat.

Figure 8:
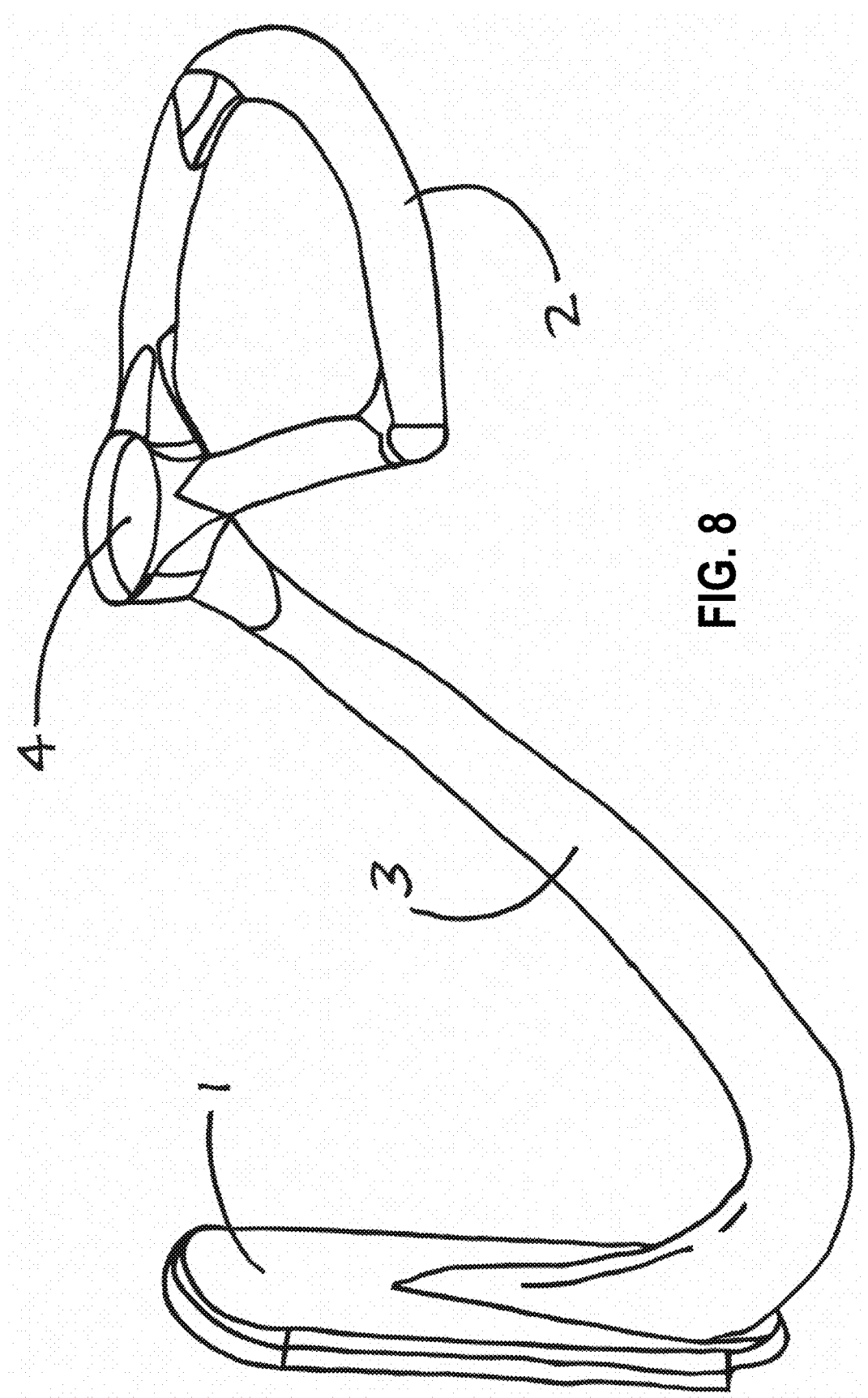
FIG. 8 depicts an isometric perspective view of a hat holder, according to an embodiment.

FIG. 8 depicts an isometric perspective view of another embodiment of a hat holder comprising a base 1 configured for substantially flush attachment to a mounting surface (such as a vertical wall or other vertical surface) and an arm 3 connected to base 1 and extending away from the mounting surface. Arm 3 joins a brim-support 2 to form a crest. Arm 3 extends away from the mounting surface forming an acute angle (A) with a body (B) of base 1. Brim-support 2, as shown, comprises an opening such that brim-support 2 forms a ring. In addition, a magnet is disposed in a topside of the hat holder a crest formed by brim-support 2 and arm 3.

Figure 9:
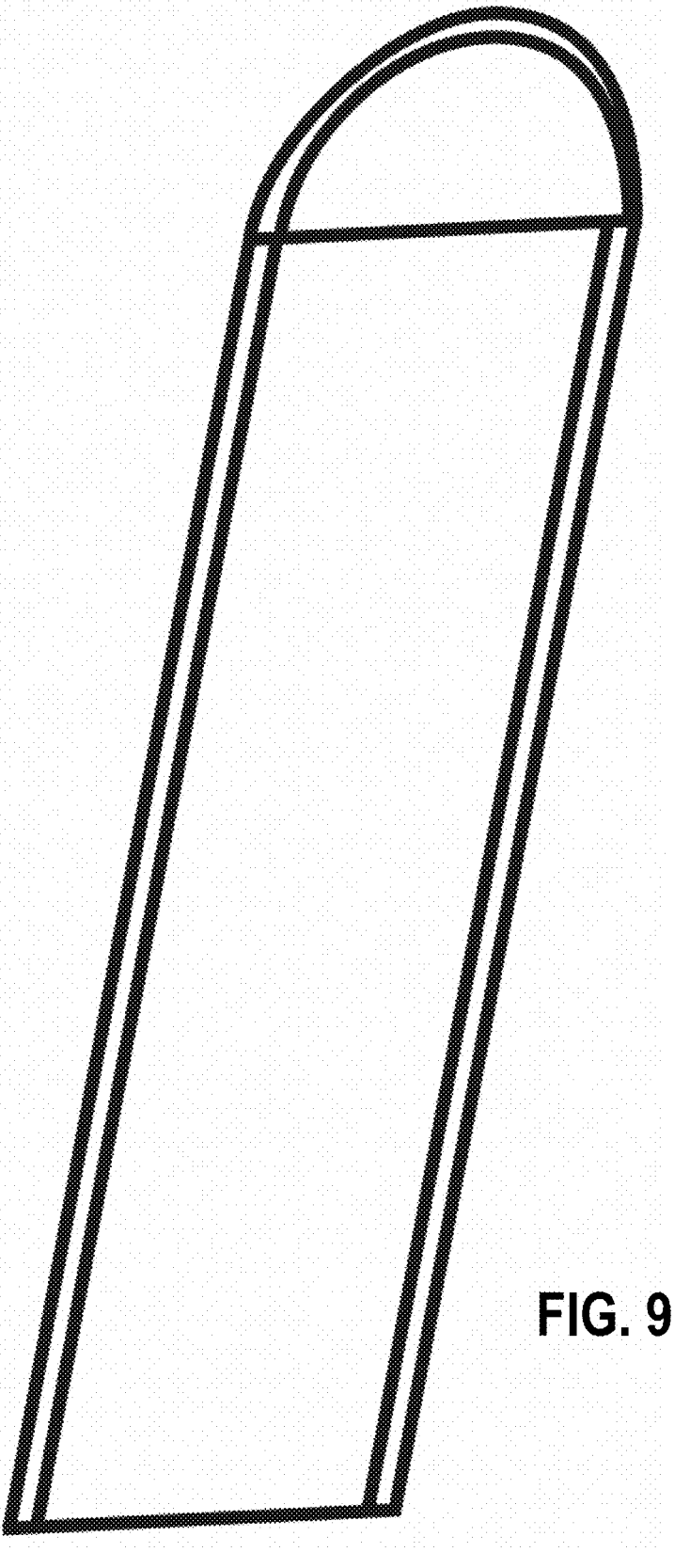
FIG. 9 depicts an isometric perspective view of a mounting feature of a base, according to an embodiment.

FIG. 9 depicts an isometric perspective view of a mounting feature of a base, according to an embodiment This mounting feature may be disposed on a bottom surface of a base (102, 1) to slidably mate with a wall cleat that is affixed to a vertical mounting surface, for example, by an adhesive or fastener(s).

Use of the disclosed hat holders maintains the shape of a hat (e.g., ball cap) without leaving any marks on the hat.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entirety, as though individually incorporated by reference.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a hat" includes a plurality of such tabs and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range, For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements or limitation or limitations which is/are not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

What is claimed is:

1. A hat holder, the hat holder comprising:
a base configured for attachment to a mounting surface, the base having a base end and a bottom surface, wherein the base end is connected to an arm, the arm extending away from the base at an upward angle, wherein the arm comprises a slot and at least two longitudinal structural supports;
a brim-support having a brim-support end, the brim-support end connecting to the arm to form a crest, wherein the brim-support extends at a downward angle from the crest; and
a magnet disposed within an underside of the hat holder such that the magnet is intersected by a plane through and parallel with the crest.

2. The hat holder of claim 1, wherein widths of the base, the arm, and the brim-support are the same.

3. The hat holder of claim 1, wherein the magnet is bisected by the plane through the crest.

4. The hat holder of claim 1, wherein the arm forms an acute angle with a body of the base.

5. The hat holder of claim 1, wherein the magnet is disposed within a topside of the hat holder.

6. The hat holder of claim 1, wherein the magnet is fully encased within the hat holder.

7. The hat holder of claim 1, wherein the bottom surface is configured to slidably mate with a wall cleat.

8. A hat holder, the hat holder comprising:
a base configured for attachment to a mounting surface; and
an arm connected to the base and extending away from the mounting surface at an upward angle, wherein the arm joins a brim-support to form a crest, wherein the brim-support is angled at a downward angle from the crest, the brim-support having an opening; and
a magnet disposed within at least a portion of the crest.

9. The hat holder of claim 8, wherein the base comprises a bottom surface configured to mate with a wall cleat.

10. The hat holder of claim 8, wherein the arm forms an acute angle with a body of the base.

11. The hat holder of claim 8, wherein the opening of the brim-support forms a ring.

12. The hat holder of claim 8, wherein the magnet is disposed within an underside of at least a portion of the crest.

13. The hat holder of claim 8, wherein the magnet is disposed within a topside of at least a portion of the crest.

14. The hat holder of claim 8, wherein the magnet is fully encased within at least a portion of the crest.

15. The hat holder of claim 8, wherein the magnet is bisected by a plane through and parallel with the crest.

16. The hat holder of claim 8, wherein the magnet is configured such that the magnetic material of a hat is attracted to the magnet.

17. The hat holder of claim 8, wherein the arm comprises a slot.

18. The hat holder of claim 8, wherein the arm comprises two longitudinal structural supports.

19. A hat holder, the hat holder comprising:
a base configured for attachment to a mounting surface, the base comprising a base end, a bottom surface and a width, the bottom surface configured to mate with a wall cleat;
an arm connected to the base end, the arm extending away from the base at an upward angle such that the arm forms an acute angle with the mounting surface, wherein the arm comprises a slot, two longitudinal structural supports, and a width;
a brim-support having a brim-support end and a width, the brim-support end connecting to the arm to form a crest, wherein the brim-support extends at a downward angle from the crest;
a magnet disposed within at least a portion of the crest such that the magnet is intersected by a plane through and parallel with the crest; and
wherein the widths of the base, the arm and the brim-support are substantially the same.

* * * * *